Oct. 11, 1960 J. J. O'TOOLE 2,956,112

DUAL MODE PHASE DETECTOR

Filed Aug. 12, 1958 2 Sheets-Sheet 1

INVENTOR.
John J. O'Toole
BY [signature]
ATTORNEY

INVENTOR.
John J. O'Toole
BY [signature]
ATTORNEY 2,956,112

DUAL MODE PHASE DETECTOR

John J. O'Toole, Orlando, Fla., assignor to Admiral Corporation, Chicago, Ill., a corporation of Delaware Filed Aug. 12, 1958, Ser. No. 754,562

5 Claims. (Cl. 178—5.4)

This invention relates, generally, to dual mode phase detectors, and more specifically to means for employing the color killer amplifier tube of a color television receiver as part of a dual mode phase detector.

In present-day color television receivers, in order to demodulate the chroma signals it is necessary to produce within the receiver a continuous wave (C.W.) signal whose phase and frequency are the same as the phase and frequency of the color burst signals contained in the received signal. Such a C.W. signal in many current receivers is produced by a system including an oscillator which is tuned, as near as is possible, to the frequency of the color bursts. The output signal of the oscillator is supplied to a phase comparator circuit (phase detector), as are the separated color bursts. The phase comparator compares the frequency and phase of the two aforementioned signals supplied thereto and produces an output signal indicative of the difference in frequency or phase of the two applied signals. Such output signal is employed to control the frequency and phase of the oscillator, usually by means of a reactance tube. It is to be noted that both frequency and phase of the oscillator output signal must be controllable, since when a receiver is first turned on the frequency of the oscillator may be several hundred cycles different from the frequency of the color bursts. In such an instance the frequency of the oscillator output signal must, of course, be "pulled in" to coincide with the frequency of the color bursts. Then the phases of the two signals must be made to coincide.

Now there is almost always some noise present in the output signal of the phase comparing circuit. Although such noise does not interfere seriously with "pull in" of the oscillator output signal in the case of frequency differences in the range of from a few cycles to a few hundred cycles, such noise does interfere seriously with the maintenance of sufficiently accurate phase synchronization once frequency "pull in" has been effected. However, if the noise level is reduced substantially, as by the insertion of a by-pass capacitor in the output circuit of the phase comparator, for example, there is a side effect in that the magnitude of the beat frequency signal between the oscillator output signal and the color bursts also will be reduced so as to reduce the "pull in" range and to increase the "pull in" time, both of which results are undesirable. Consequently, it can be seen that it would be desirable to have a dual mode phase detector which would have a wide noise bandwidth during "pull in" and a narrow noise bandwidth at synchronism.

As further background for the present invention, the relation of the prior art phase control circuit with the color killer circuit should be noted briefly. Specifically, the output of the phase detector is supplied to the grid of the color killer tube which responds thereto to produce an output voltage which functions to either cut off the chroma amplifier or to not cut off the chroma amplifier depending on whether a monochrome or a chroma signal, respectively, is being received by the television receiver. More specifically, the phase comparator and the color killer tube are arranged and constructed so that during the reception of chroma signal and after frequency synchronization has been effected the color killer tube is non-conductive and the plate potential of the color killer tube is maximum. However, during the reception of both monochrome signal and chroma signal, before frequency synchronization has occurred, the color killer tube is conductive and thus has a reduced plate potential. It is this plate potential which controls the conductivity of the chroma amplifier.

In addition, a negatively poled pulsating gating signal, synchronized with the blanking pulses, also is supplied to the grid of the color killer tube which responds thereto to cause the chroma amplifier to pass color bursts whether a monochrome or a color signal is being received. The passage of such color bursts is necessary in order to indicate to the receiver circuit when the reception of a chroma signal begins, so that the color killer tube can respond properly to cause the chroma amplifier to become conductive.

It is an object of the present invention to provide a simple and inexpensive dual-mode phase detector.

A further aim of the invention is to provide a dual mode phase detector employing the color killer amplifier tube of a color television receiver as a portion thereof.

Another object of the invention is the improvement of dual mode phase detectors, generally.

In accordance with the invention, the output of the phase detector is supplied to the grid of the oscillator controlling reactance tube through a filter network having a narrow bandwidth to provide good phase control. The output of the phase detector is also supplied to the grid of the color killer tube whose cathode is connected to a cathode follower resistor. When a chroma signal is being received and the chroma signal and the oscillator output signal are not synchronized, the color killer tube will be conductive and the phase detector output signal will appear across the cathode follower resistor. Means are provided for supplying said last-mentioned signal to the grid of the reactance tube, thus effectively shunting out the narrow band noise filter to permit transmission of noise from the phase detector to the grid of the reactance tube. The phase detector is constructed so that when synchronization occurs the output signal thereof becomes a negative D.-C. potential which cuts off the color killer tube so that the narrow band filter becomes the only effective circuit between the phase comparator and the reactance tube. Thus, dual mode phase detection is effected.

The above-mentioned and other objects and features of the invention will be more fully understood from the following detailed description thereof when read in conjunction with the drawings in which.

Figure 1:
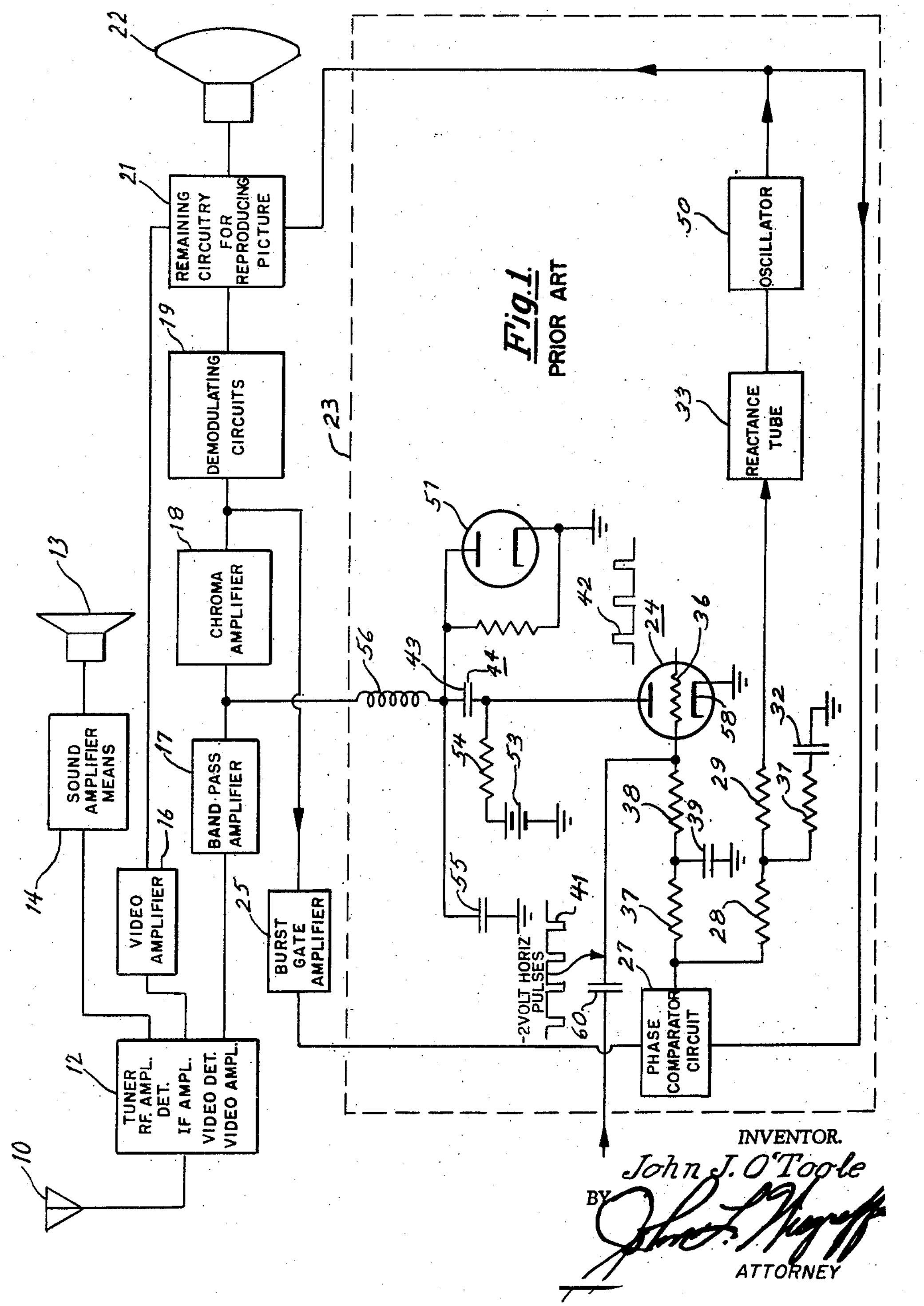
Fig.1 PRIOR ART
Fig. 1 is a schematic sketch of background prior art.

Referring now to Fig. 1, a description of the operation of the circuit shown therein will be made. As indicated hereinbefore, the circuit of Fig. 1 is prior art and is included in the specification to provide necessary background for an understanding of the invention.

In the various figures herein corresponding circuit elements will be identified by similar reference characters, primed in successive figures.

The transmitted signal is intercepted by the antenna 10 and is supplied to the tuner, the R.-F. amplifier, the first detector, the intermediate amplifier stages, the video detector, and the video amplifier, all arranged in cascade in conventional manner and shown within the block 12. The composite video signal appearing at the output of the block 12 is supplied to three different circuits; the sound channel comprising the sound amplifying means 14 and the speaker 13, the monochrome channel comprising the video amplifier 16, and the chroma channel comprising the bandpass amplifier 17, the chroma amplifier 18, and the demodulating circuits 19. The circuits within the block 21 are conventional and function to supply the monochrome signal to the picture tube 22 and also to decode the chroma signals and supply such decoded chroma signals to the picture tube 22.

Figures 2, 3:
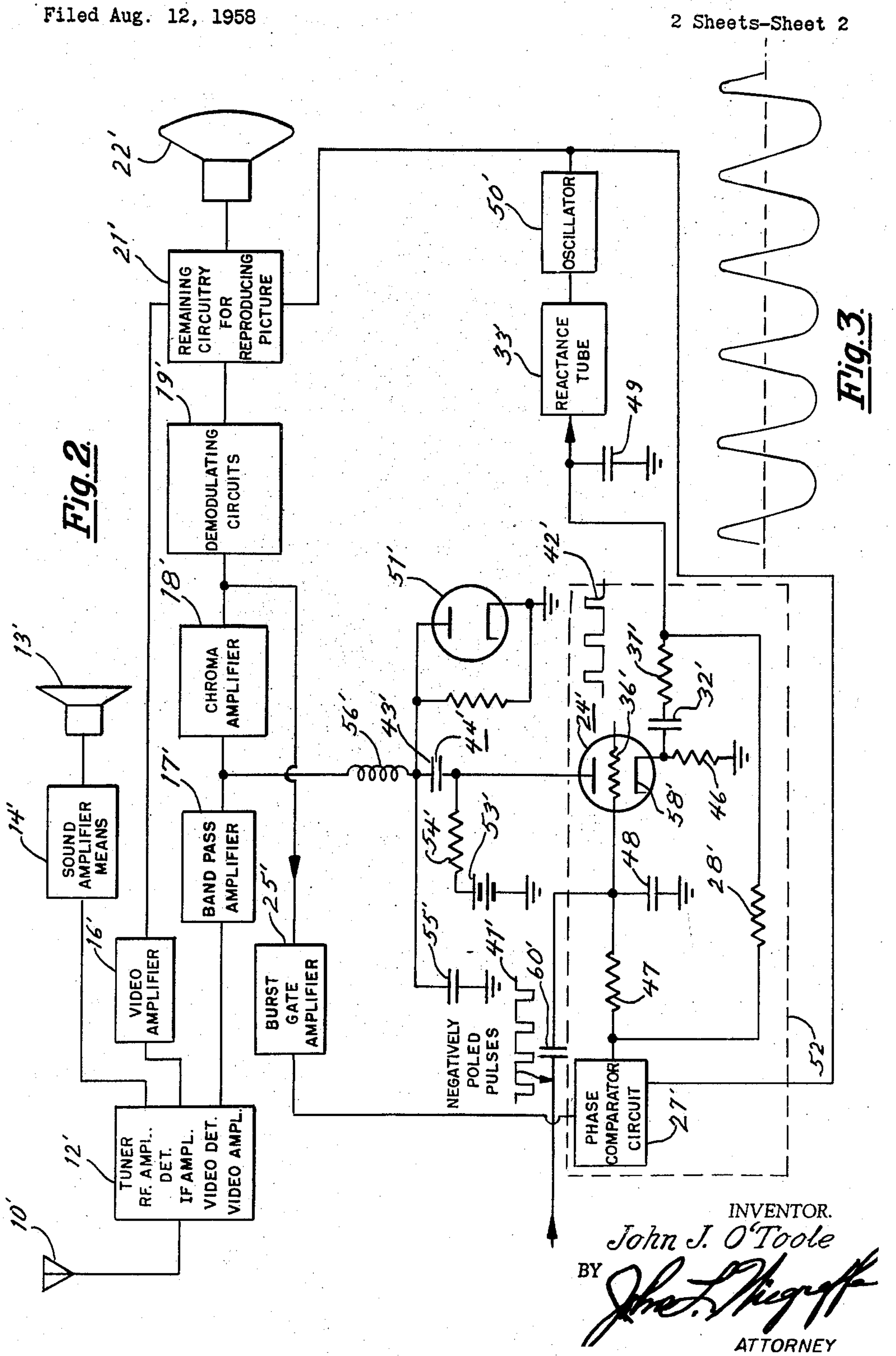
Fig. 2 is a schematic sketch of the invention.
Fig. 3 shows the waveform of the output signal of the phase detector.

Now as stated hereinbefore, it is necessary to reproduce, in a present-day color receiver, a continuous wave signal whose phase and frequency coincide with the phase and frequency of the sub-carrier of which the color bursts are portions thereof. The function of the circuitry within the dashed-line rectangle 23 is to reproduce such a color sub-carrier signal. Because it is an integral part of the invention (as shown in Fig. 2), the color killer tube 24 and associated circuitry also is included in the dashed-line rectangle 23 and will be described in some detail.

The output of the chroma amplifier 18 is supplied to the burst gate amplifier 25 which functions to separate the color bursts from the composite chroma signal and to supply these color bursts to the phase comparator circuit 27. Also supplied to the phase comparator circuit 27 is the output of the oscillator 50. The phase comparator 27 functions to compare the two signals supplied thereto to produce an output signal representative of the difference in the frequency and the phase thereof. Such a signal is represented generally by the waveform of Fig. 3.

The phase detector 27 is constructed so that a negative D.-C. voltage of cut-off magnitude is supplied to the grid 36 of tube 24 when synchronism exists between the oscillator output signal and the color bursts, and 0 volts (with respect to the cathode of tube 24) is supplied to said grid 36 when a monochrome signal is being received. Such signals are supplied to the grid 36 through the filter circuit comprising resistor 37 and capacitor 39 and the isolating resistor 38.

In the case of the 0 volts being supplied to the grid 36, the tube 24 will not be cut off and the negatively poled pulses, represented by the waveform 41 and synchronized with horizontal synchronizing pulses, supplied to the grid 36 through capacitor 60 will produce an output signal 42 at the plate of tube 24. Due to the clamping action of diode 51 a negative charge will be accumulated on the plate 43 of the capacitor 44, except during the peaks of the pulses of the signal 42. Consequently, the chroma amplifier 18 will be cut off, except during the blanking periods. As stated hereinbefore, it is necessary that the chroma amplifier be conductive during the blanking periods, since it must pass color bursts should a color signal suddenly be received. The passage of color bursts is necessary, of course, to produce in the phase detector 27 and the color killer tube 24 the output signals to cause the chroma amplifier 18 to become conductive. Otherwise the chroma amplifier 18 would remain non-conductive even when a color signal was being received.

In the case of the negative D.-C. cutoff potential being supplied to the grid 36, the tube 24 is cut off and no signal is supplied from the plate thereof to the control grid of the chroma amplifier 18. Consequently, the chroma amplifier 18 is conductive during this time. The plate of the tube 24 is connected to the positive battery 53 through load resistor 54. By pass capacitor 55 and inductor 56 are provided to filter out any color sub-carrier signal leaking through tube 24.

Now the output of the phase detector 27 is supplied also to the grid of the reactance tube 33 through a filter comprising resistors 28, 29, and 31, and capacitor 32.

It would be desirable to supply the output of the phase detector 27 directly to the reactance tube 33 except that noise is present in the output of the phase detector which ends to upset the phase synchronization of the oscillator 50 output and the color bursts. The capacitor 32 is added to attenuate these noise pulses by by-passing them to ground. However, capacitor 32 introduces "hunting" into the circuit due to the fact that the amount of charge thereon, which varies with and is indicative of the amount of asynchronization, lags behind the actual frequency difference between the oscillator output signal and the color bursts. The resistor 31 is provided as a compromise, i.e., to supply at least a small portion of the output signal of the phase detector 27 to the grid of the reactance tube 33 as soon as a change in said output signal occurs.

It is desirable to make capacitor 32 large in order to eliminate as much noise as possible. However, if capacitor 32 is made too large (resulting in a narrow noise bandwidth), it will also function to by-pass too much of the beat frequency signal (between the oscillator output signal and the color bursts), thus impairing "pull in" of the oscillator 50 to synchronism with the color bursts. On the other hand, if capacitor 32 is too small (resulting in a wide noise bandwidth) there will be too much noise present at synchronization, thus disturbing said synchronization. Alternatively, the width of the noise bandwidth can be decreased or increased by decreasing or increasing the value of the resistor 28, which also will decrease or increase the degree of integration.

Referring now to Fig. 2 there is shown a schematic sketch of the invention which solves the above mentioned difficulties by providing a dual mode phase detecting system. More specifically, the portion of Fig. 2 which constitutes the invention, is that portion within the dashed-line block 52. All of the remainder of the circuit of Fig. 2 is old in the art and has been discussed in connection with the circuit of Fig. 1.

Looking now at the structure within the dashed-line rectangle 52 the cathode 58' of the color killer tube 24' is connected to ground potential through a cathode resistor 46. Further, the by-pass capacitor 32' is not connected to ground potential as is the case in the circuit of Fig. 1, but rather is connected to the cathode of the tube 24'. Consequently, when the tube 24' is conductive the signal applied to the control grid 36' thereof from the phase comparator 27' will appear also at the cathode 58' and will be supplied to the reactance tube 33' through the capacitor 32' and the resistor 31'. Under these circumstances, the capacitor 32' functions as a coupling capacitor.

The circuit constants of Fig. 2 are selected so that the resistor 28' is very large in comparison with the total resistance of resistor 47, the grid-to-cathode resistance of tube 24' (when conductive) and the resistor 31'. Therefore, when the tube 24' is conductive, the circuit path including resistor 47, the grid-cathode gap of tube 24', the capacitor 32', and the resistor 31' function as a low impedance circuit for the output signal of the phase detector 27'; thus effectively by-passing the circuit path consisting of the resistor 28'.

From the above discussion it can be seen that the tube 24' functions as a switch during frequency pull-in to supply the beat signal from the phase detector 27' to the reactance tube 33' through the color killer tube 24' without substantially decreasing the amplitude of said beat signal. Viewed in another manner, the large resistor 28' is by-passed substantially by the tube 24' during frequency pull-in, thus reducing the amount of integration of the output signal of the phase detector 27'. When frequency synchronization does occur, the output of the phase detector 27' becomes a minus four D.-C. volts, which completely cuts off the color killer tube 24'. Consequently, during phase synchronization no signal is transmitted through the tube 24' to the reactance tube. There is, however, a signal transmitted through the resistor 28' to the reactance tube 33' as described below.

Although there is no beat frequency signal generated in the phase detector 27' during phase synchronization, there is a slight fluctuation of the D.-C. output of the phase detector during synchronization due to small variations in the phase of the oscillator output signal and the color bursts.

Such D.-C. output voltage is supplied to the circuit comprising resistors 31' and 46 and capacitor 32' through resistor 28' which has a magnitude of the order of one or two megohms to provide a long time constant with capacitor 32' (resistors 31' and 46 may have values of the order of 20 K ohms and 0.5 K ohm respectively). Such an output circuit is not very responsive to sudden changes in the magnitude of the phase detector output but is responsive to slower changes, such as drifts in phase. Worded in another way the filter circuit (resistors 28', 31', and 46 and capacitor 32') is a narrow bandwidth noise filter and therefore is more responsive to slow changes than to sharp, sudden changes in the amplitude of the phase comparator output. Noise pulses consequently are substantially eliminated. Thus a dual mode phase detector system is effected.

It is to be noted that during the reception of monochrome the tube 24' of Fig. 2 functions as a color killer tube just as does the tube 24 of Fig. 1.

It is to be further noted that the form of the invention shown and described herein is but a preferred embodiment thereof and that various changes may be made in the design thereof without departing from the spirit or scope of the invention.

I claim:

1. In a color television receiver comprising means for separating color bursts from a received color television signal, an oscillator tuned to the frequency of the color bursts, a reactance tube for controlling the frequency of the output signal of the oscillator, dual mode phase detector means having a wide noise bandpass characteristic during frequency "pull-in" of said oscillator and a narrow noise bandpass characteristic when "pull-in" has occurred, said dual mode phase detector means comprising phase comparator means for comparing the frequency and phase of the color bursts and the oscillator output signal and for developing a voltage indicative of the frequency and phase relationships therebetween, color killer means including an electron discharge device having a control grid and a cathode, cathode follower resistor means connected to said cathode, said electron discharge device responsive to said voltage developed by said phase comparator means being driven conductive or non-conductive in accordance with asynchronism or synchronism, respectively, between said color bursts and said oscillator output signal, narrow bandwidth noise filter circuit means for supplying said voltage of said phase comparator means to said reactance tube, and means including the electron coupling between said grid and said cathode during conduction of said discharge device and a portion of said narrow bandwidth noise filter circuit means for supplying the signal appearing at said cathode to said reactance tube to effectively shunt said narrow bandwidth noise filter circuit means when said electron discharge device is conductive.

2. A color television receiver in accordance with claim 1, in which said narrow bandwidth noise filter circuit means comprises resistor means connected between said phase comparator means and said reactance tube, and capacitor means connected between said reactance tube and said cathode, said resistor means and said capacitor means having magnitudes such to provide said narrow noise bandpass.

3. A color television receiver in accordance with claim 1, in which said narrow bandwidth noise filter circuit means comprises first resistor means connected between said phase comparator means and said reactance tube, and the series combination of a capacitor means and a second resistor means connected between said cathode and said reactance tube, said capacitor means and said first and second resistor means having values chosen such to remove a substantial portion of the noise present in said voltage developed by said phase comparator means, and said first resistor being at least several times the impedance existing between said control grid of said electron discharge device and said reactance tube when said electron discharge device is conductive.

4. In a color television receiver including means for reproducing a composite chroma signal from a received color television signal; chroma signal amplifying means; separating means responsive to the output signal of said chroma signal amplifying means for separating reference frequency color bursts from said composite chroma signal; oscillator means tuned to the frequency of said color bursts; reactance tube means for controlling the frequency of said oscillator means; phase comparator means responsive to the simultaneous application of the output signal of said separating means and the output signal of said oscillator means for producing an output signal indicative of the frequency and phase relationships of the applied signals; color killer means including an electron discharge device having a control grid and a cathode; cathode follower resistor means connected to said cathode; first coupling means coupling the output of said phase comparator means to said reactance tube means; said first coupling means including first circuit means connecting the output of said phase comparator means to said grid, and second circuit means connecting said reactance tube means to said cathode; second coupling means connecting the output of said phase comparator means to said reactance tube means, said discharge device rendered conductive responsive to the output signal of said phase comparator means during frequency asynchronization of said color bursts and said oscillator output signal and rendered nonconductive during frequency synchronization of said color bursts and said oscillator output signal, whereby said second coupling means is effectively shunted when said discharge device is in a conductive state.

5. In a color television receiver having a chroma channel for deriving a composite chroma signal from a received composite television signal, said channel including: a chroma amplifier for amplifying said derived chroma signal; a burst separator for separating color reference frequency bursts from said composite chroma signal; an oscillator tuned to the frequency of said color bursts; oscillator control means for controlling the frequency and phase of said oscillator; phase comparator means for comparing the frequency and phase of the output of said burst separator with the frequency and phase of the output of said oscillator and developing a control signal indicative of the frequency and phase relationships between said outputs; color killer means for disabling said chroma amplifier when said reference color bursts are absent from said received television signal, said color killer means including an electron discharge device having a control grid and a cathode; and coupling means interconnecting the output of said phase comparator means with said oscillator control means, said coupling means including two parallel paths, one of said paths having narrow bandwidth frequency characteristics and the other of said paths having wide bandwidth frequency characteristics, said other path being completed by the conduction current flowing between said control grid and said cathode of said electron discharge device and being effective to shunt out said one path during conduction of said electron discharge device.

References Cited in the file of this patent

"Proceedings of the I.R.E.," January 1954 (pages 288–299 relied on). (Copy in U.S. Patent Office Library.)